Patented May 12, 1942

2,282,769

UNITED STATES PATENT OFFICE 2,282,769

SULPHONIC ACID AMIDE COMPOUNDS AND MANUFACTURE THEREOF

Paul Pöhls, Wuppertal-Elberfeld, Germany, assignor to Winthrop Chemical Company, Inc., New York, N. Y., a corporation of New York No Drawing. Application April 3, 1939, Serial No. 265,789. In Germany April 5, 1938

6 Claims. (Cl. 260—397.7)

The present invention relates to sulphonic acid amide compounds and to the manufacture thereof.

According to application for Letters Patent Ser. No. 157,808, filed Aug. 6, 1937, compounds can be obtained which are readily soluble in water with neutral reaction and are suitable for injection and effective against the streptococci infections of the warm-blooded animals when introducing sulphonic acid or carboxylic acid groups into para-aminobenzene-sulphonic acid arylides not in the benzene ring, connected with the sulphur atom of the sulphonic acid amide group but in the aryl radical connected with the nitrogen atom of the sulphonic acid amide group. Such compounds have proved to be effective also with virus infections.

According to the present invention compounds of considerable activity can also be obtained when preparing the para-aminobenzene-sulphonic acid arylides, bearing in the aryl radical, connected with the nitrogen atom of the sulphonic acid amide group, sulphinic acid groups. The amino groups in the para-position may be free or substituted, for instance by acyl such as acetayl, propionyl, benzoyl or alkyl such as methyl, ethyl, isopropyl and allyl. The sulphinic acid radicals may be present in the aryl radical once or several times. The aryl radical may bear further substituents as free or closed hydroxyl- and amino groups, alkyl- or nitro-groups or halogen atoms, while the benzene radical, connected with the sulphur atom of the sulphonamide group preferably does not contain nuclear substituents.

According to the invention the aforesaid compounds can be obtained by reacting para-aminobenzene-sulphonic acids or their reactive derivatives, such as esters or halides, in which the para-amino-group preferably bears substituents, for instance acyl- or alkyl-radicals, with aryl compounds containing apart from a primary or secondary amino group at least one sulphinic acid group, or by causing to react para-aminobenzenesulphonic acid amides, the para-amino-group of which preferably is substituted as described above and the sulphonic acid amide group of which still at least contains one reactive hydrogen atom with aryl compounds, bearing apart from at least one sulphinic acid group one substituent, for instance a halogen atom, which is capable of being exchanged and is reactive by the presence of the said sulphinic acid group or other groups, for instance nitro groups.

It further has proved that the new compounds also can be obtained by causing the formation of the para-amino group in the benzene nucleus of the benzenesulphonic acid arylides which already contain the otherwise required substituents, from a substituent convertible into an amino group and standing in the para-position of the benzene nucleus. For the production of the para-amino compounds, for instance para-nitro-, para-azo and para-hydrazo compounds can be reduced, para-azomethine compounds can be hydrolysed or para-halogen compounds can be reacted with ammonia, primary or secondary amines.

According to another feature of the present invention the new compounds may also be obtained when transforming into the sulphinic acid group a group which is convertible into the sulphinic acid group and is already present in the arylide radical of a compound as specified before or when introducing the sulphinic acid radicals directly into the arylide radical. For this purpose, for instance, sulphinic acid-esters, -halides and -anhydrides can be saponified. Furthermore compounds of the kind specified but having in the aryl radical a sulphur group the oxidation stage of which is lower than that of the sulphinic acid group, as for instance the mercapto-, disulfide- and xanthogenate group may be oxidized to the corresponding sulphinic acids, or compounds having in the aryl radical a sulphur group the oxidation stage of which is higher than that of the sulphinic acid group, as for instance the sulphohalide or thiosulphonic acid group may be reduced to the corresponding sulphinic acids. The sulphohalide compounds mentioned before are prepared acording to the present invention by reacting upon 4-acylaminobenzene-sulphonamides the amide-nitrogen atom of which is substituted by a benzene radical with a halogen sulphonic acid, preferably chloro-sulphonic acid.

Furthermore, compounds of the kind specified having in the aryl radical an amino group may be diazotized and treated with sulphurous acid in the presence of copper (according to Gattermann). The direct introduction of the sulphinic acid radicals into the arylide radical may be performed by treatment of the para-aminobenzenesulphonic acid arylides, which preferably are substituted in the para-amino group as indicated above, with aluminium halides and sulphurous acid.

The sulphinic acid compounds thus obtainable are neutral products in the form of their salts with alkali- and alkaline-earth-metal bases, for instance in the form of the sodium, potassium, lithium and calcium salts or in the form of their salts with ammonia or amine bases such as diethylamino, diethylaminoethanol, ethylenediamine, piperidine and piperazine. In general these salts are soluble in water.

The invention is illustrated by the following examples without being restricted thereto:

Example 1

127 grams of 4-acetylamino-benzene-sulphonic acid anilide are poured while stirring and cooling into 400 cc. of chloro-sulphonic acid at a temperature of 25° C. After one hour's stirring at 60–65° C. the reaction mixture is poured on to ice and the 4-(para-acetylamino-benzene-sulphonamido)-benzenesulphochloride precipitated is extracted with ether. After drying the ethereal solution with sodium sulfate it is concentrated and the sulphochloride is precipitated in crystalline form melting at 150° C. by the addition of petroleum ether.

38.9 grams of 4-(para-acetylamino-benzenesulphonamido)-benzene-sulphochloride are slowly poured while stirring into a solution of 30.2 grams of anhydrous sodium sulfite in 200 cc. of water. By means of cooling the reaction is directed in such a manner that the temperature does not exceed 25° C. 30 cc. of a 30% sodium hydroxide solution are added in portions to keep the reaction solution alkaline. After a three hours' stirring at room temperature the solution is filtered and the 4-(para-acetylamino-benzenesulphonamido)-benzenesulphinic acid is precipitated from the filtrate by the addition of 60% sulphuric acid. The precipitate is filtered off with suction, washed with water and dried at 100° C. The new compound melts while decomposing at 143–144° C. It is soluble in sodium carbonate solution and is precipitated from this solution by mineral acids.

54 grams of 4-(para-acetylamino-benzene-sulphonamido)-benzenesulphinic acid are boiled under reflux with 240 cc. of 15% aqueous sodium hydroxide solution for 45 minutes. After cooling the solution is acidified with 60% sulphuric acid; thereupon the 4-(para-aminobenzene-sulphonamido)-benzenesulphinic acid separates in a crystalline form. It can be purified by redissolution in dilute sodium hydroxide solution and reprecipitation with acetic acid. The substance dried at 100° C. decolorizes gradually when heated and decomposes completely at about 228° C. while foaming.

In an analogous manner 4-dimethylamino-benzene-sulphonic acid anilide is transformed by the action of chlorosulphonic acid into the 4-(γ-dimethylamino-benzene-sulphonamido)-benzenesulphochloride and reduced to the 4-(para-dimethylamino-benzenesulphonamido)-benzenesulphinic acid.

Example 2

85 grams of 4-acetylamino-benzene-sulphinic acid are boiled under reflux with 500 cc. of 15% aqueous sodium hydroxide solution during 45 minutes. After cooling the solution is slightly acidified with 60% sulphuric acid and the 4-amino-benzene-sulphinic acid is precipitated in this manner. This compound can be purified by dissolution in dilute sodium hydroxide solution and precipitation with acetic acid. After drying at 100° C. it decolorizes gradually when further heated and decomposes completely at about 230° C.

15.7 grams of 4-aminobenezene-sulphinic acid are dissolved in 100 cc. of normal sodium hydroxide solution and stirred with 21 grams of sodium acetate and 32 grams of 4-acetylamino-benzenesulphochloride for 3 hours at 45–50° C. The almost clear solution is filtered and the 4-(para-acetlyamino-benzenesulphonamido)-benzenesulphinic acid melting at 142° C. is precipitated with acetic acid.

When using instead of 32 grams of para-acetlyamino-benzenesulphochloride 32 grams of para-propionylamino-benzene-sulphochloride 4-(para-propionylamino-benzenesulphonamido)-benzenesulphinic acid melting at 145–147° C. is obtained.

When using instead of 4-aminobenzene-sulphinic acid the 3-aminobenzene sulphinic acid or the 4-methyl-3-aminobenzene-sulphinic acid or the 2-methyl-5-aminobenzene-sulphinic acid or 2-amino-5-bromo-benzenesulphinic acid, para-acylamino-benzenesulphonamido-benzenesulphinic acid compounds are obtained which are correspondingly substituted.

Example 3

10 grams of 4-(para-nitrobenzenesulphonamido)-benzenesulphinic acid are dissolved in 29.2 cc. of normal sodium hydroxide solution and added drop by drop while stirring to a reduction mixture of 80 grams of iron and 150 cc. of water containing 2 cc. of glacial acetic acid while boiling under reflux. After half an hour's boiling the solution is made slightly alkaline and the iron sludge is filtered off. The 4-(para-aminobenzene-sulphonamido)-benzenesulphinic acid is obtained from the filtrate after acidifying with glacial acetic acid, showing the same qualities as indicated in Example 1.

The starting-material is obtained in the following manner:

110 grams of para-nitrobenzene-sulphochloride are dissolved in 500 cc. of aceton. A solution of 45 grams of pyridine and 47 grams of aniline is added drop by drop while stirring and boiling under reflux. After a 2 hours' boiling the clear reaction solution is stirred into dilute hydrochloric acid and the para-nitrobenzene-sulphonic acid anilide separated is recrystallized from methanol. It melts at 167–168° C.

125 grams of 4-nitrobenzene-sulphonic acid anilide are poured while stirring and cooling into 500 cc. of chlorosulphonic acid at a temperature of 25° C. After one hour's stirring at 60–65° C. the reaction mixture is poured on to ice and the 4-(para-nitrobenzene-sulphonamido)-benzenesulphochloride precipitated is dissolved in ether. After drying with sodium sulfate the ethereal solution is concentrated and the sulphochloride melting at 78° C. is precipitated in crystalline form by the addition of petroleum ether.

96 grams of 4-(para-nitrobenzenesulphonamido)-benzenesulphochloride are slowly poured while stirring into a solution of 77 grams of anhydrous sodium sulfite and 600 cc. of water whereby the temperature rises up to 35° C. 80 cc. of 30% sodium hydroxide solution are added in portions to keep the reaction solution alkaline. After three hours' stirring at room temperature the solution is filtered and the 4-(para-nitrobenzene-sulphonamido)-benzenesulphinic acid is precipitated from the filtrate by the addition of 60% sulphuric acid. After washing with water and drying at 100° C. the new compound melts at 146° C. It is soluble in sodium carbonate solution and is precipitated from this solution by mineral acids.

Example 4

96.5 grams of sodium 4-nitro-1-chlorobenzene-2-sulphinate (prepared according to Annalen der Chemie 380, page 315, by reduction of 4-nitro-1-chlorobenzene-2-sulphochloride with stannous chloride and hydrochloric acid in alcoholic solution) are boiled under reflux with 80 grams of para-acetylamino-benzenesulphonamide, 60 grams of potassium carbonate, 3 grams of copper powder in 500 cc. of amylalcohol for 8 hours while stirring. The reaction solution is treated with water and the amylalcohol blown off with steam. The aqueous solution after cooling with ice is filtered and the 2-(para-acetylamino-benzenesulphonamido) - 4 - nitrobenzene - sulphinic acid is precipitated with 60% of sulphuric acid and obtained from methylalcohol in colorless needles melting at 212° C.

40 grams of 2-(para-acetylamino-benzenesulphoamido)-4-nitrobenzene-sulphinic acid are boiled under reflux in 200 ccs of 15% sodium hydroxide solution for 45 minutes. After cooling the solution is acidified with 60% sulphuric acid; thereupon the 2-(para-aminobenzene-sulphoamido)-4-nitrobenzene-sulphinic acid separates in crystals melting at 163° C.

Example 5

35 grams of para-acetylamino-benzenesulphone-4-amino-anilide are dissolved in 30 cc. of concentrated sulphuric acid and 150 cc. of water and 70 cc. of 10% sodium nitrite solution are added drop by drop while stirring at a temperature of +7° C. 100 grams of sulphur dioxide are subsequently introduced and thereupon 100 grams of copper powder in portions. After four hours' stirring at ordinary temperature the solution is filtered with suction and the copper residue extracted with a sodium carbonate solution. The 4-(para-acetylaminobenzene-sulphonamido)-benzenesulphinic acid showing the qualities indicated in example 1 is obtained from the filtrate after acidifying with 60% sulphuric acid.

The starting-material is obtained as follows: 69 grams of para-nitraniline are dissolved in 300 cc. of pyridine. 117 grams of para-acetylamino-benzenesulphochloride are poured into the solution while stirring, whereby the temperature rises up to 80° C. After one hour's stirring at 80° C. the solution is poured while stirring into dilute hydrochloric acid while cooling with ice and the para-acetylamino-benzenesulphone-4-nitranilide precipitated is filtered with suction and washed with water. After drying the new compound melts at 240° C.

133 grams of para-acetylamino-benzenesulphone-4-nitranilide are added in portions while stirring to a boiling reducing mixture of 800 grams of iron, 1000 cc. of water and 10 cc. of glacial acetic acid. After four hours' boiling the reaction mixture is made alkaline and filtered with suction. The para-acetylamino-benzenesulphone-4-aminoanilide melting at 218–220° C. is obtained from the filtrate upon the addition of glacial acetic acid.

I claim:

1. A product of the formula

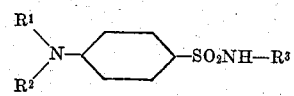

wherein $R^1$ stands for one of the substituents hydrogen and lower alkyl, $R^2$ stands for one of the substituents hydrogen, lower alkyl and the radicals of the lower aliphatic and benzene carboxylic acids and $R^3$ stands for a benzenesulphinic acid radical, which compounds are neutral products in the form of their salts with alkali- and alkaline-earth-metal, ammonia and amine bases.

2. A product of the formula

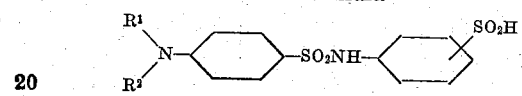

wherein $R^1$ stands for one of the substituents hydrogen and lower alkyl, $R^2$ stands for one of the substituents hydrogen, lower alkyl and the radicals of the lower aliphatic and benzene carboxylic acids, which compounds are neutral products in the form of their salts with alkali- and alkaline-earth-metal, ammonia and amine bases.

3. A product of the formula

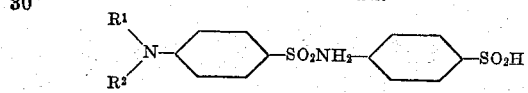

wherein $R^1$ stands for one of the substituents hydrogen and lower alkyl, $R^2$ stands for one of the substituents hydrogen, lower alkyl and the radicals of the lower aliphatic and benzene carboxylic acids, which compounds are neutral products in the form of their salts with alkali- and alkaline-earth-metal, ammonia and amine bases.

4. A product of the formula

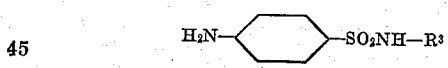

wherein $R^3$ stands for a benzenesulphinic acid radical, which compounds are neutral products in the form of their salts with alkali- and alkaline-earth-metal, ammonia and amine bases.

5. A product of the formula

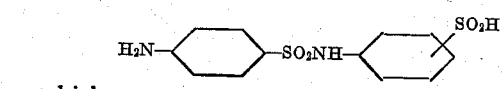

which compounds are neutral products in the form of their salts with alkali- and alkaline-earth-metal, ammonia and amine bases.

6. The product of the formula

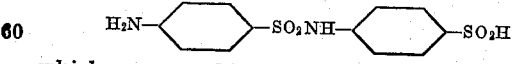

which compound is a neutral product in the form of its salts with alkali- and alkaline-earth-metal, ammonia and amine bases.

PAUL PÖHLS.